(12) United States Patent
Zhao et al.

(10) Patent No.: US 12,717,472 B2
(45) Date of Patent: Aug. 25, 2026

(54) METHOD AND APPARATUS FOR DISPLAYING OPERATING TRACK

(71) Applicant: Huawei Technologies Co., Ltd., Shenzhen (CN)

(72) Inventors: Yuanbing Zhao, Shenzhen (CN); Chundong Li, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 235 days.

(21) Appl. No.: 18/602,613

(22) Filed: Mar. 12, 2024

(65) Prior Publication Data

US 2024/0264736 A1 Aug. 8, 2024

Related U.S. Application Data

(63) Continuation of application No. PCT/CN2022/119810, filed on Sep. 20, 2022.

(30) Foreign Application Priority Data

Oct. 9, 2021 (CN) .......................... 202111177953.1

(51) Int. Cl.
*G06F 3/04883* (2022.01)
*G06F 3/041* (2006.01)
*G06F 3/04845* (2022.01)

(52) U.S. Cl.
CPC ........ *G06F 3/04883* (2013.01); *G06F 3/0418* (2013.01); *G06F 3/04845* (2013.01);
(Continued)

(58) Field of Classification Search
CPC .... G06F 3/041; G06F 3/0488; G06F 3/04883; G06F 21/32; G06F 3/0354; G06F 3/0484; G06F 21/34; G06F 3/04845; G06F 21/60; G06F 3/03; G06F 3/038; G06F 3/042; G06F 3/044; G06F 3/045; G06F 3/046; G06F 3/048; G06F 3/0485; G06F 3/04842;
(Continued)

(56) References Cited

U.S. PATENT DOCUMENTS

2008/0270896 A1* 10/2008 Kristensson ........ G06F 3/04883 715/261
2010/0079389 A1* 4/2010 Liu ......................... G06F 3/045 345/173

(Continued)

FOREIGN PATENT DOCUMENTS

CN 108415661 A 8/2018
JP 2017162330 A 9/2017

OTHER PUBLICATIONS

Robert Zeleznik et al., “Fluid Inking: Augmenting the Medium of Free-Form Inking with Gestures”, Computer Science Department, Jun. 7, 2006, XP58302751A, total 8 pages.

*Primary Examiner* — Rayeez R Chowdhury
(74) *Attorney, Agent, or Firm* — Slater Matsil, LLP

(57) ABSTRACT

In accordance with an embodiment, a method for displaying an operation track includes: determining that a first touch point on a touchscreen is in a continuous writing state; and in response to detecting that at least two touch points exist on the touchscreen, displaying input content on the touchscreen based on a movement track of the first touch point, wherein the at least two touch points comprise the first touch point.

20 Claims, 4 Drawing Sheets

(52) U.S. Cl.
CPC .............. *G06F 2203/04806* (2013.01); *G06F 2203/04808* (2013.01)

(58) Field of Classification Search
CPC ........ G06F 40/166; G06F 13/00; G06F 13/28; G06F 3/0338; G06F 3/0346
See application file for complete search history.

(56) References Cited

U.S. PATENT DOCUMENTS

| | | | | |
|---|---|---|---|---|
| 2012/0188206 | A1* | 7/2012 | Sparf | G06F 3/042 362/326 |
| 2012/0210253 | A1* | 8/2012 | Luna | H04L 51/04 715/753 |
| 2012/0254773 | A1* | 10/2012 | Viswanathan | G06F 3/04883 715/753 |
| 2013/0229331 | A1* | 9/2013 | Dearman | G06F 3/04883 345/156 |
| 2014/0056523 | A1* | 2/2014 | Na | G06F 3/0488 382/189 |
| 2015/0317053 | A1* | 11/2015 | Baek | G06F 3/04817 715/765 |
| 2015/0363035 | A1 | 12/2015 | Hinckley et al. | |
| 2016/0098186 | A1 | 4/2016 | Sugiura | |
| 2016/0154465 | A1* | 6/2016 | Kim | G06F 3/017 345/173 |
| 2016/0179364 | A1* | 6/2016 | Nicholson | G06V 30/347 715/863 |
| 2017/0083154 | A1* | 3/2017 | Sugano | G06F 3/0412 |
| 2017/0371485 | A1* | 12/2017 | Ohi | G06F 3/0383 |
| 2018/0348955 | A1* | 12/2018 | Gao | G06F 3/0412 |
| 2019/0278417 | A1* | 9/2019 | Kuo | G06F 3/04162 |
| 2021/0012574 | A1 | 1/2021 | Fu et al. | |

* cited by examiner

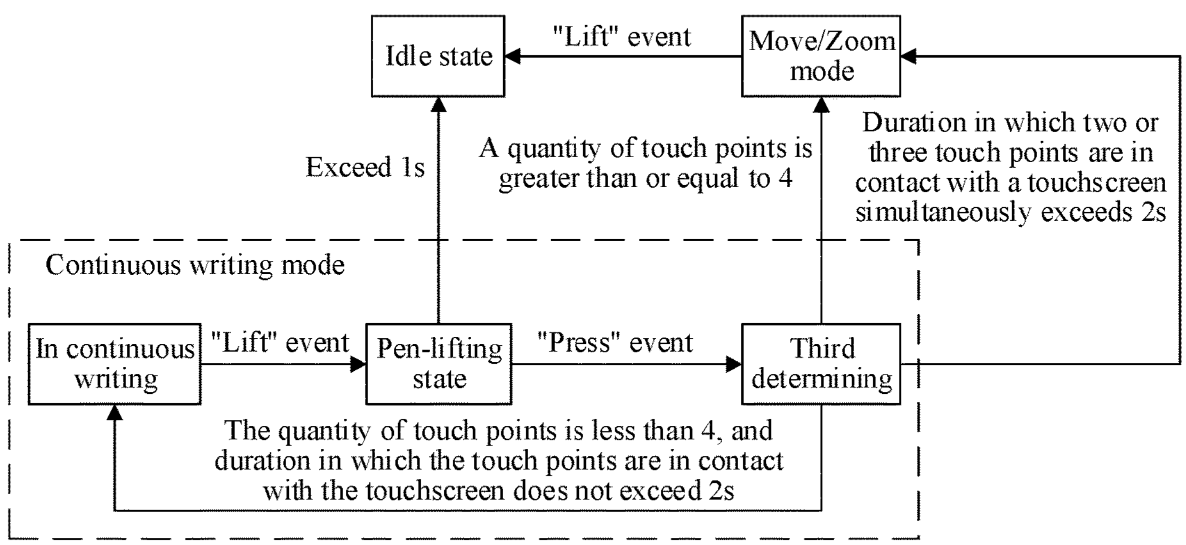

FIG. 7

"Press" event

Idle state

"Lift" event

A contact area is greater than a second preset threshold

First determining

Erase mode

Exceed 100 ms

Second determining

At least two touch points

Move/Zoom mode

Duration in which the at least two touch points are in contact simultaneously exceeds 2s Exceed 200 ms Exceed 1s Continuous writing mode "Lift" event Pen-lifting state "Press" event Third determining

FIG. 8

METHOD AND APPARATUS FOR DISPLAYING OPERATING TRACK

CROSS-REFERENCE TO RELATED APPLICATIONS

This application is a continuation of International Application No. PCT/CN2022/119810, filed on Sep. 20, 2022, which claims priority to Chinese Patent Application No. 202111177953.1, filed on Oct. 9, 2021. The disclosures of the aforementioned applications are hereby incorporated by reference in their entireties.

TECHNICAL FIELD

This application relates to the field of electronic technologies, and in particular, to a method and apparatus for displaying an operation track.

BACKGROUND

An infrared touchscreen is constituted by an infrared emission and receiving sensor element that is mounted on a touchscreen outer frame, and an infrared detection network is formed on a surface of the touchscreen. Any touching object may change an infrared ray on a touch point to implement an operation on the touchscreen. Most current infrared touchscreens support 10-point or 20-point touch. On an electronic whiteboard based on the infrared touchscreen, a process of an operation (for example, writing, gesture erasing, and gesture moving or zooming) is easily affected by another object (for example, a cuff of a sleeve) in contact with the touchscreen. As a result, an unintended operation easily occurs in the operation on the electronic whiteboard, affecting efficiency of a writing operation.

SUMMARY

Embodiments of this application provide a method and apparatus for displaying an operation track, to prevent an unintended operation from occurring in a writing process due to another object in contact with a touchscreen, thereby improving efficiency of a writing operation.

According to a first aspect, an embodiment of this application provides a method for displaying an operation track. The method includes: determining that a first touch point on a touchscreen is in continuous writing; and when it is detected that there are at least two touch points on the touchscreen, displaying input content on the touchscreen based on a movement track of the first touch point, where the at least two touch points include the first touch point. Because the first touch point is in the continuous writing, when another object is in contact with the touchscreen, the input content continues to be displayed on the touchscreen based on the movement track of the first touch point, so that an unintended operation caused by the another object in contact with the touchscreen does not occur in a writing process, and efficiency of a writing operation is improved.

In a possible design, it is detected that duration in which the first touch point is in a writing state exceeds a first preset threshold. The writing state means that no other touch points exist on the touchscreen, and a contact area of the first touch point is less than a second preset threshold. By determining that the duration of the writing state exceeds the first preset threshold, that the first touch point on the touchscreen is in the continuous writing is determined, thereby ensuring accuracy of triggering the touchscreen to enter a state of the continuous writing.

In another possible design, when duration in which the first touch point fails to be detected exceeds a third preset threshold, it is determined that the first touch point quits the continuous writing. By configuring duration of a continuous writing mode, the continuous writing mode is maintained within a proper time range, ensuring applicability of the writing operation.

In another possible design, the at least two touch points include a second touch point, and a contact area of the second touch point is greater than the second preset threshold. In the continuous writing mode, if the contact area of the second touch point is greater than the second preset threshold, input of the second touch point is forbidden, and the input content maintains being displayed on the touchscreen based on the movement track of the first touch point. This avoids an unintended operation caused by a sleeve of a user or another object in accidental contact with the touchscreen.

In another possible design, whether duration in which the at least two touch points are in contact with the touchscreen exceeds a fourth preset threshold is determined. When the duration in which the at least two touch points are in contact with the touchscreen does not exceed the fourth preset threshold, the input content is displayed on the touchscreen based on the movement track of the first touch point. That the duration in which the at least two touch points are in contact with the touchscreen simultaneously does not exceed the fourth preset threshold is determined, to prevent the continuous writing mode from being quit when another object is in accidental contact with the touchscreen, thereby improving efficiency of the writing operation when the continuous writing mode is maintained.

In another possible design, when the duration in which the at least two touch points are in contact with the touchscreen exceeds the fourth preset threshold, content displayed on the touchscreen is moved or zoomed based on sliding tracks of the at least two touch points. A move/zoom mode is entered only when it is detected that the duration in which the at least two touch points are in contact with the touchscreen simultaneously exceeds the fourth preset threshold, to avoid direct triggering of entering the move/zoom mode when another object is in accidental contact with the touchscreen, thereby ensuring diversity of the writing operation and avoiding the unintended operation.

According to a second aspect, an embodiment of this application provides a method for displaying an operation track. The method includes: determining, based on an operation of a first touch point on a touchscreen, that the touchscreen enters a continuous writing mode; and when it is detected that there are at least two touch points on the touchscreen, displaying input content on the touchscreen based on a movement track of the first touch point, where the at least two touch points include the first touch point. Because the touchscreen enters the continuous writing mode, when another object is in contact with the touchscreen, the input content continues to be displayed on the touchscreen based on the movement track of the first touch point, so that an unintended operation caused by the another object in contact with the touchscreen does not occur in a writing process, and efficiency of a writing operation is improved.

In a possible design, the determining, based on an operation of a first touch point on a touchscreen, that the touchscreen enters a continuous writing mode includes: determining that the first touch point on the touchscreen is in continuous writing by determining that duration of a writing state exceeds a first preset threshold, thereby ensuring accuracy of triggering the touchscreen to enter a state of the continuous writing.

In another possible design, it is detected that no other touch points exist when the first touch point is in contact with the touchscreen, duration in which the first touch point is in contact with the touchscreen exceeds the first preset threshold, and a contact area of the first touch point is less than a second preset threshold. By determining that the duration of the writing state exceeds the first preset threshold, that the first touch point on the touchscreen is in the continuous writing is determined, thereby ensuring the accuracy of triggering the touchscreen to enter the state of the continuous writing.

In another possible design, when duration in which the first touch point fails to be detected exceeds a third preset threshold, it is determined that the touchscreen quits the continuous writing mode. By configuring duration of the continuous writing mode, the continuous writing mode is maintained within a proper time range, improving applicability of the writing operation.

In another possible design, the at least two touch points include a second touch point, and a contact area of the second touch point is greater than the second preset threshold. In the continuous writing mode, if the contact area of the second touch point is greater than the second preset threshold, input of the second touch point is forbidden, and the input content maintains being displayed on the touchscreen based on the movement track of the first touch point. This avoids an unintended operation caused by a sleeve of a user or another object in accidental contact with the touchscreen.

In another possible design, whether duration in which the at least two touch points are in contact with the touchscreen exceeds a fourth preset threshold is determined. When the duration in which the at least two touch points are in contact with the touchscreen does not exceed the fourth preset threshold, the input content is displayed on the touchscreen based on the movement track of the first touch point. That the duration in which the at least two touch points are in contact with the touchscreen simultaneously does not exceed the fourth preset threshold is determined, to prevent the continuous writing mode from being quit when another object is in accidental contact with the touchscreen, thereby improving efficiency of the writing operation when the continuous writing mode is maintained.

In another possible design, when the duration in which the at least two touch points are in contact with the touchscreen exceeds the fourth preset threshold, content displayed on the touchscreen is moved or zoomed based on sliding tracks of the at least two touch points. A move/zoom mode is entered only when it is detected that the duration in which the at least two touch points are in contact with the touchscreen simultaneously exceeds the fourth preset threshold, to avoid direct triggering of entering the move/zoom mode when another object is in accidental contact with the touchscreen, thereby ensuring diversity of the writing operation and avoiding the unintended operation.

According to a third aspect, an embodiment of this application provides an apparatus for displaying an operation track. The apparatus includes:

a processing module, configured to determine that a first touch point on a touchscreen is in continuous writing; and a display module, configured to display input content on the touchscreen based on a movement track of the first touch point when it is detected that there are at least two touch points on the touchscreen, where the at least two touch points include the first touch point.

In a possible design, the processing module is further configured to detect that duration in which the first touch point is in a writing state exceeds a first preset threshold. The writing state means that no other touch points exist on the touchscreen, and a contact area of the first touch point is less than a second preset threshold.

In another possible design, the processing module is further configured to determine, when duration in which the first touch point fails to be detected exceeds a third preset threshold, that the first touch point quits the continuous writing.

In another possible design, the at least two touch points include a second touch point, and a contact area of the second touch point is greater than the second preset threshold.

In another possible design, the processing module is further configured to determine whether duration in which the at least two touch points are in contact with the touchscreen exceeds a fourth preset threshold. The display module is further configured to display the input content on the touchscreen based on the movement track of the first touch point when the duration in which the at least two touch points are in contact with the touchscreen does not exceed the fourth preset threshold.

In another possible design, the display module is further configured to move or zoom, based on sliding tracks of the at least two touch points and when the duration in which the at least two touch points are in contact with the touchscreen exceeds the fourth preset threshold, content displayed on the touchscreen.

For operations performed in the third aspect and the possible designs of the third aspect and beneficial effects thereof, refer to the operations performed in the first aspect and the possible designs of the first aspect and the beneficial effects thereof. Details are not described herein again.

According to a fourth aspect, an embodiment of this application provides an apparatus for displaying an operation track. The apparatus includes:

a processing module, configured to determine, based on to an operation of a first touch point on a touchscreen, that the touchscreen enters a continuous writing mode; and a display module, configured to display input content on the touchscreen based on a movement track of the first touch point when it is detected that there are at least two touch points on the touchscreen, where the at least two touch points include the first touch point.

In another possible design, the processing module is further configured to detect that no other touch points exist when the first touch point is in contact with the touchscreen, duration in which the first touch point is in contact with the touchscreen exceeds a first preset threshold, and a contact area of the first touch point is less than a second preset threshold.

In another possible design, the processing module is further configured to determine, when duration in which the first touch point fails to be detected exceeds a third preset threshold, that the touchscreen quits the continuous writing mode.

In another possible design, the at least two touch points include a second touch point, and a contact area of the second touch point is greater than the second preset threshold.

In another possible design, the processing module is further configured to determine whether duration in which the at least two touch points are in contact with the touchscreen exceeds a fourth preset threshold. The display module is further configured to display the input content on the touchscreen based on the movement track of the first touch point when the duration in which the at least two touch points are in contact with the touchscreen does not exceed the fourth preset threshold.

In another possible design, the display module is further configured to move or zoom, based on sliding tracks of the at least two touch points and when the duration in which the at least two touch points are in contact with the touchscreen exceeds the fourth preset threshold, content displayed on the touchscreen.

For operations performed in the fourth aspect and the possible designs of the fourth aspect and beneficial effects thereof, refer to the operations performed in the second aspect and the possible designs of the second aspect and the beneficial effects thereof. Details are not described herein again.

According to a fifth aspect, this application provides an apparatus for displaying an operation track. The apparatus may be an electronic device, an apparatus in the electronic device, or an apparatus that can be used together with the electronic device. The apparatus for displaying an operation track may alternatively be a chip system. The apparatus for displaying an operation track may perform the methods according to the first aspect and the second aspect. A function of the apparatus for displaying an operation track may be implemented by hardware, or may be implemented by executing corresponding software by hardware. The hardware or the software includes one or more modules corresponding to the function. The module may be software and/or hardware. For operations performed by the apparatus for displaying an operation track and beneficial effects thereof, refer to the methods in the first aspect and the second aspect and the beneficial effects thereof. Repeated content is not described again.

According to a sixth aspect, this application provides an apparatus for displaying an operation track. The apparatus for displaying an operation track includes a processor. When the processor invokes a computer program in a memory, the method according to either of the first aspect or the second aspect is performed.

According to a seventh aspect, this application provides an apparatus for displaying an operation track. The apparatus for displaying an operation track apparatus includes a processor and a memory. The memory is configured to store a computer program. The processor is configured to execute the computer program stored in the memory, to enable the apparatus for displaying an operation track to perform the method according to either of the first aspect or the second aspect.

According to an eighth aspect, this application provides an apparatus for displaying an operation track. The apparatus for displaying an operation track includes a processor, a memory, and a transceiver. The transceiver is configured to receive a channel or a signal, or send a channel or a signal. The memory is configured to store a computer program. The processor is configured to invoke the computer program from the memory to perform the method according to either of the first aspect or the second aspect.

According to a ninth aspect, this application provides an apparatus for displaying an operation track. The apparatus for displaying an operation track includes a processor and an interface circuit. The interface circuit is configured to receive a computer program and transmit the computer program to the processor. The processor runs the computer program to perform the method according to either of the first aspect or the second aspect.

According to a tenth aspect, this application provides a computer-readable storage medium. The computer-readable storage medium is configured to store a computer program. When the computer program is executed, the method according to either of the first aspect or the second aspect is implemented.

According to an eleventh aspect, this application provides a computer program product including a computer program. When the computer program is executed, the method according to either of the first aspect or the second aspect is implemented.

BRIEF DESCRIPTION OF THE DRAWINGS

To describe the technical solutions in embodiments of this application or in the background more clearly, the following briefly describes the accompanying drawings for describing embodiments of this application or the background.

FIG. 4 is a schematic diagram of working mode switching according to an embodiment of this application;

FIG. 5 is a schematic diagram of another type of working mode switching according to an embodiment of this application;

FIG. 7 is a schematic diagram of another type of working mode switching according to an embodiment of this application;

FIG. 8 is a schematic diagram of another type of working mode switching according to an embodiment of this application.

DETAILED DESCRIPTION OF THE EMBODIMENTS

The following describes embodiments of this application with reference to the accompanying drawings in embodiments of this application.

Figure 1:
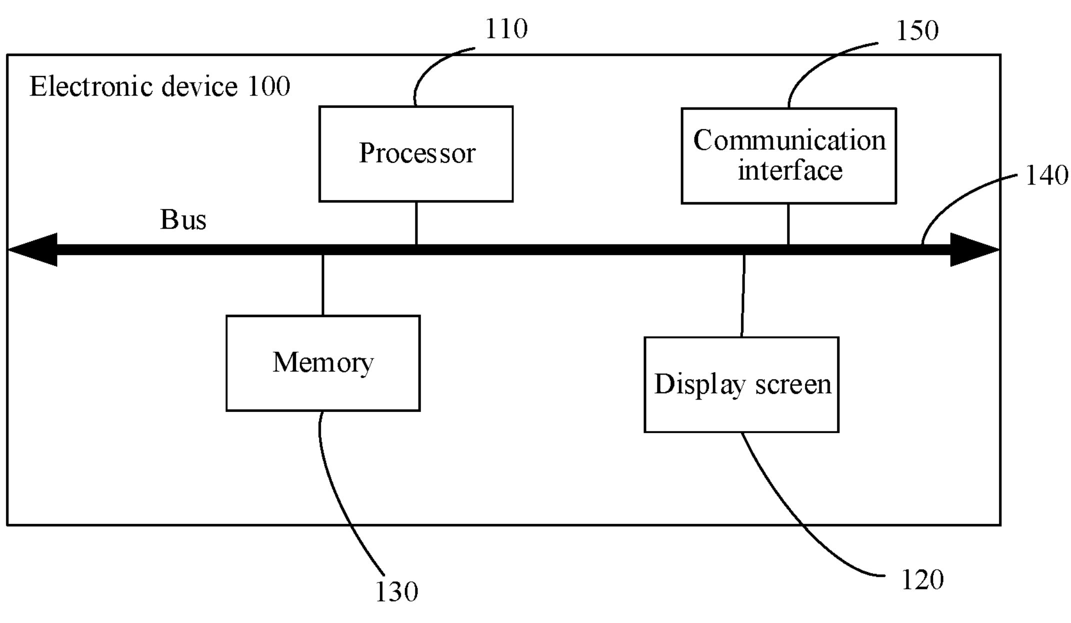
FIG. 1 is a schematic diagram of an electronic device.

FIG. 1 is a schematic diagram of a structure of an electronic device 100.

The electronic device 100 may include a processor 110 and a display screen 120.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, a neural-network processing unit (NPU), and/or the like. Different processing units may be independent components, or may be integrated into one or more processors. The controller may be a nerve center and a command center of the electronic device 100. The controller may generate an operation control signal based on instruction operation code and a time sequence signal, to complete control of instruction fetching and instruction execution.

A memory may be further disposed in the processor 110, and is configured to store instructions and data. In some embodiments, the memory in the processor 110 is a cache memory. The memory may store instructions or data that has been used or cyclically used by the processor 110. If the processor 110 needs to use the instructions or the data again, the processor 110 may directly invoke the instructions or the data from the memory. This avoids repeated access and reduces wait time of the processor 110, thereby improving a speed rate of a system.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like.

The display screen 120 may be a touchscreen, and the touchscreen may be an infrared touchscreen. The display screen 120 may be configured to display content input by a user, or may be configured to display an image, a video, or the like. The display screen 120 includes a display panel. The display panel may be a liquid crystal display (LCD), an organic light-emitting diode (OLED), an active-matrix organic light-emitting diode (AMOLED), a flex light-emitting diode (FLED), a mini-LED, a micro-LED, a micro-oLED, a quantum dot light-emitting diode (QLED), or the like. In some embodiments, the electronic device 100 may include one or N display screens 120, where N is a positive integer greater than 1.

Optionally, the electronic device 100 may further include a memory 130, a communication bus 140, and a communication interface 150.

The memory 130 may be configured to store computer-executable program code. The executable program code includes instructions. The processor 110 runs the instructions stored in the memory 130, to execute various function applications of the electronic device 100 and process data. The memory 130 may include a program storage area and a data storage area. The program storage area may store an operating system, an application program required by at least one function (for example, a voice play function or an image play function), and the like. The data storage area may store data created during use of the electronic device 100 (for example, audio data and an address book), and the like. In addition, the memory 130 may include a high-speed random access memory, and may further include a non-volatile memory, for example, at least one magnetic disk storage device, a flash memory component, or a universal flash storage (UFS).

The communication bus 140 may be a peripheral component interconnect (PCI) bus, an extended industry standard architecture (EISA) bus, or the like. The bus may be classified into an address bus, a data bus, a control bus, and the like. For convenience of representation, only one bold line is used for representation in FIG. 1, but it does not represent that there is only one bus or one type of bus. The communication bus 140 is configured to implement connection and communication between these components.

The communication interface 150 is configured to perform signaling or data communication with another electronic device.

It may be understood that the structure shown in this embodiment of this application does not constitute a specific limitation on the electronic device 100. In some other embodiments of this application, the electronic device 100 may include more or fewer components than those shown in the figure, or some components may be combined, or some components may be split, or different component arrangements may be used. The components shown in the figure may be implemented by hardware, software, or a combination of software and hardware.

It may be understood that an interface connection relationship between the modules shown in this embodiment of this application is merely an example for description, and constitutes no limitation on the structure of the electronic device 100. In some other embodiments of this application, the electronic device 100 may alternatively use an interface connection manner different from that in the foregoing embodiment, or use a combination of a plurality of interface connection manners.

The electronic device in this embodiment of this application may be a mobile phone, a tablet computer, a laptop computer, an ultra-mobile personal computer (UMPC), a handheld computer, a netbook, a personal digital assistant (PDA), a wearable electronic device, a virtual reality device, or the like. Alternatively, the electronic device may include an infrared touchscreen and a processing device (for example, a computer).

Figure 2:
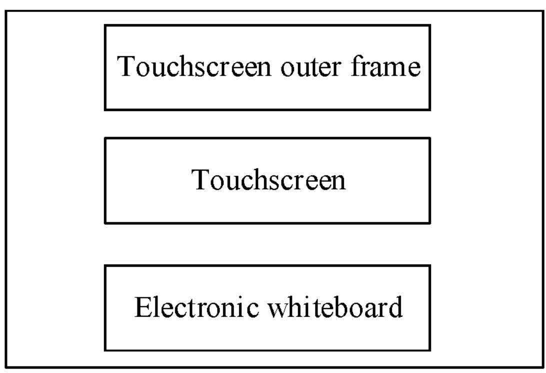
FIG. 2 is a schematic diagram of another electronic device.

For another example, FIG. 2 is a schematic diagram of a structure of another electronic device according to an embodiment of this application. The electronic device may include a touchscreen outer frame, a touchscreen, and an electronic whiteboard. An infrared emission and receiving sensor element that is mounted on the touchscreen outer frame constitute an infrared touchscreen, and an infrared detection network is formed on a surface of the touchscreen. The touchscreen outer frame sends a signal from one side and receives a signal from the other side. If the electronic whiteboard is blocked by a finger, the electronic whiteboard may sense a touch position of the finger.

A working mode of the electronic device may include a writing mode, an erase mode, and a move/zoom mode.

Writing mode: When a single finger is in contact with the touchscreen (a contact area of a touch point on the touchscreen is less than a preset threshold), the electronic whiteboard identifies this action and determines that the electronic whiteboard enters the writing mode. Then, the finger continuously moves, and the electronic whiteboard displays a corresponding movement track.

Erase mode: When a palm is in contact with the touchscreen (a contact area of a touch point on the touchscreen is greater than or equal to a preset threshold), the electronic whiteboard identifies this action and determines that the electronic whiteboard enters the erase mode. If the palm continuously moves, the electronic whiteboard erases content displayed on the touchscreen.

Move/Zoom mode: When two (a plurality of) fingers (at least two touch points) are in contact with the touchscreen simultaneously to perform co-directional or contra-directional movement, the electronic whiteboard identifies this action as moving or zooming of content displayed on the touchscreen, and moves or zooms, based on sliding tracks of the at least two touch points, the content displayed on the touchscreen.

After the electronic whiteboard is started up, the electronic whiteboard monitors a touch event (for example, a "press" event). When detecting the touch event, the electronic whiteboard obtains data of the touch event. The data of the touch event includes an identity (ID) of the touch event, a touch position, a contact area, a quantity of touch points, and the like. Then, the electronic whiteboard determines a current operation mode (the writing mode, the erase mode, or the move/zoom mode) of the touchscreen based on the data of the touch event. Then, the electronic whiteboard operates based on the operation mode and the data of the touch event, and records and updates data of the electronic whiteboard. For example, the electronic whiteboard obtains a piece of handwriting data (for example, a handwriting ID, a data point set, a color, and a width), draws a picture based on recorded and updated data, and finally displays the drawn picture. For example, in the writing mode, handwriting is drawn when a finger of a user moves.

However, on the electronic whiteboard based on the infrared touchscreen, a process of an operation is easily affected by another object (for example, a cuff of a sleeve) in contact with the touchscreen. As a result, an unintended operation easily occurs in the operation on the electronic whiteboard. For example, in a writing process, the finger frequently falls down and rises, and in this case, the cuff of the sleeve of the user is in contact with the touchscreen. As a result, the electronic whiteboard receives a plurality of touch points, identifies this action, and determines that the electronic whiteboard enters the move/zoom mode. Alternatively, when a contact area between the sleeve and the touchscreen is large, the electronic whiteboard identifies this action and determines that the electronic whiteboard enters the erase mode.

To resolve the foregoing technical problems, embodiments of this application provide the following solutions.

Figure 3:
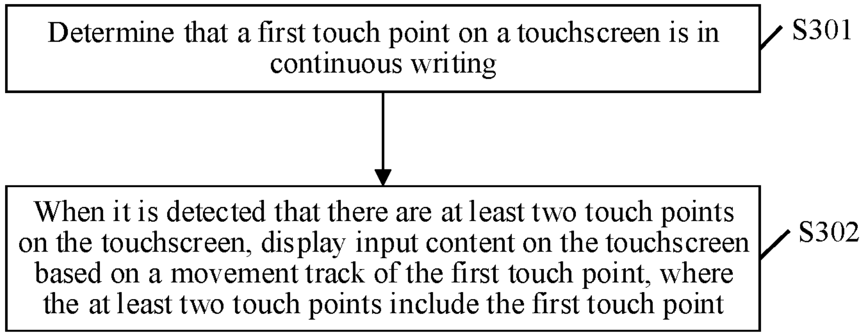
FIG. 3 is a schematic flowchart of displaying an operation track according to an embodiment of this application.

FIG. 3 is a schematic flowchart of a method for displaying an operation track according to an embodiment of this application. The method includes at least the following steps.

S301: Determine that a first touch point on a touchscreen is in continuous writing.

The first touch point represents one or more touch points that continuously operate in a same area in a time period. For example, when writing a Chinese character "san" (which includes three horizontal lines), a user needs to continuously perform a "press" operation and a "lift" operation for three times in an area of the touchscreen. In other words, three touch points are generated, and all the three touch points may be considered as the first touch point.

That the first touch point on the touchscreen is in the continuous writing is determined in the following several optional manners.

In a first optional manner, it is detected that duration in which the first touch point is in a writing state exceeds a first preset threshold. The writing state means that no other touch points exist on the touchscreen, and a contact area of the first touch point is less than a second preset threshold. In this way, it is determined that the first touch point on the touchscreen is in the continuous writing. The first preset threshold may include but is not limited to 100 ms or 200 ms. The second preset threshold may be a minimum threshold (StartEraseSize) for triggering gesture erasing. In other words, if a contact area of a touch point is greater than or equal to StartEraseSize, the touchscreen enters the erase mode.

In a second optional manner, it may be determined, based on an operation of the first touch point on the touchscreen, that the touchscreen enters a continuous writing mode, to determine that the first touch point on the touchscreen is in the continuous writing. The continuous writing mode may be a working mode in which the writing state is maintained in a time period without being affected by the outside.

Further, it may be detected that no other touch points exist when the first touch point is in contact with the touchscreen, duration in which the first touch point is in contact with the touchscreen exceeds a first preset threshold, and a contact area of the first touch point is less than a second preset threshold, to determine that the touchscreen enters the continuous writing mode.

Optionally, if it is detected that the contact area of the first touch point is greater than or equal to the second preset threshold within duration corresponding to the first preset threshold, it is determined that the touchscreen enters the erase mode. Alternatively, if a touch point other than the first touch point is detected within the duration corresponding to the first preset threshold, it is determined that the touchscreen enters the move/zoom mode.

For example, an electronic whiteboard is in an idle state after being started up. When detecting a "press" event of a finger or a palm on the touchscreen, the touchscreen receives data of a touch point, and transmits the data of the touch point to the electronic whiteboard. The data of the touch point includes an ID of the touch point, a touch position P (x, y), and a contact area (size). One touch point corresponds to one ID, one touch position, and one contact area. The electronic whiteboard records the ID of the touch point in an identity list (IdList), and determines a quantity of touch points and an operation mode based on the ID recorded in the IdList. In addition, a timer is started for timing. The touchscreen enters the writing mode to create handwriting, records the handwriting as the first touch point, and sets a unique ID to 000001.

If the touchscreen detects that one or more pieces of data in the data of the touch point change, the touchscreen reports the detected changed data of the touch point to the electronic whiteboard. Specifically, if the user continues to "move" on the touchscreen and the touchscreen detects that a touch position of the first touch point changes, the electronic whiteboard updates the touch position of the touch point and draws the handwriting. If the touchscreen detects that the contact area of the first touch point changes, the touchscreen also reports a changed contact area to the electronic whiteboard. Each time the electronic whiteboard receives the "press" event, the electronic whiteboard records the ID of the touch point in the IdList. Each time the electronic whiteboard receives a "lift" event, the electronic whiteboard removes the ID of the touch point from the IdList.

After the touchscreen enters the writing mode, the following cases may occur when the user is writing.

In a first case, as shown in FIG. 4, an electronic device is in an idle state at first. When the "press" event of the finger or the palm on the touchscreen is detected, the timer is started for timing. Within 100 ms after the timer starts timing, when it is detected that the contact area of the first touch point changes, the electronic whiteboard performs first determining to determine whether the contact area of the first touch point is greater than or equal to the second preset threshold. If the contact area is greater than or equal to the second preset threshold, the touchscreen enters the erase mode. The electronic whiteboard sets a current operation mode to the erase mode, deletes a note corresponding to the first touch point, stops timing, and resets the timer. Then, when the "lift" event of the palm of the user is detected, the electronic whiteboard receives the "lift" event, sets the current operation mode to an idle mode (None), removes the ID (000001) of the first touch point from the IdList, and restores to the idle state.

In a second case, as shown in FIG. 5, within 100 ms after the timer starts timing, when the electronic whiteboard receives the "press" event, the electronic whiteboard performs second determining to determine whether a touch point other than the first touch point is received. If the touch point other than the first touch point is received, the touchscreen enters the move/zoom mode. The electronic whiteboard sets a current operation mode to the move/zoom mode, records an Id (000002) corresponding to a second touch point in the IdList, deletes the ID (000001) of the first touch point, stops timing, and resets the timer. It should be noted that, each time the touchscreen detects the "lift" event of the finger of the user, the touchscreen reports the "lift" event to the electronic whiteboard. After receiving the "lift" event, the electronic whiteboard removes the Id corresponding to the touch point from the IdList and determines whether the IdList is empty. If the IdList is not empty, it indicates that the touchscreen is still in the move/zoom mode, and the operation continues. If the IdList is empty, it indicates that there is no touch point on the touchscreen, the electronic whiteboard sets the current operation mode to the idle mode (None), and restores to the idle state.

Figure 6:
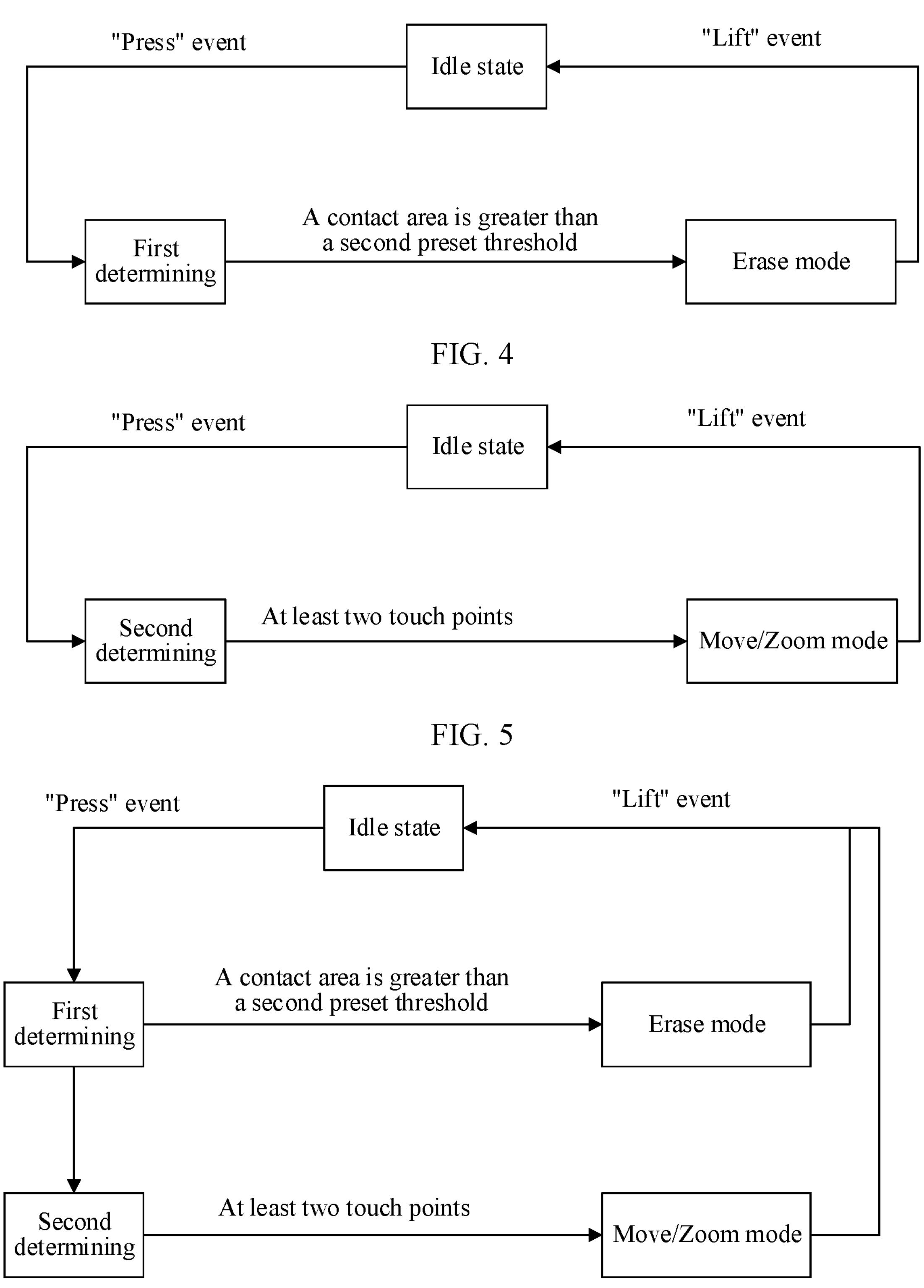
FIG. 6 is a schematic diagram of another type of working mode switching according to an embodiment of this application.

In a third case, as shown in FIG. 6, as same as the first case, within the first 100 ms after the timer starts timing, if the contact area of the first touch point is greater than or equal to the second preset threshold, the touchscreen enters the erase mode. If the contact area of the first touch point is always less than the second preset threshold within the first 100 ms after the timer starts timing, the touchscreen does not enter the erase mode. Within next 100 ms after the timer starts timing, the electronic whiteboard performs the second determining to determine whether a touch point other than the first touch point is received. If the touch point other than the first touch point is received, the touchscreen enters the move/zoom mode. The electronic whiteboard sets a current operation mode to the move/zoom mode, records an Id corresponding to the touch point in the IdList, deletes the ID (000001) of the first touch point, stops timing, and resets the timer.

Optionally, whether the touchscreen enters the move/zoom mode may be determined within the first 100 ms. If the touchscreen does not enter the move/zoom mode within the first 100 ms, whether the touchscreen enters the erase mode may be determined within the next 100 ms. If the touchscreen does not enter the erase mode, the touchscreen enters the continuous writing mode.

In a fourth case, if the electronic whiteboard detects no touch point other than the first touch point within 100 ms after the timer starts timing and the contact area of the first touch point is less than the second preset threshold, the touchscreen enters the continuous writing mode, and it is determined that the first touch point on the touchscreen is in the continuous writing.

Optionally, when duration in which the first touch point fails to be detected exceeds a third preset threshold, it is determined that the first touch point quits the continuous writing. The third preset threshold includes but is not limited to 1 s or 2 s.

For example, after the touchscreen enters the continuous writing mode, the user stops writing after writing for a time period. The touchscreen detects the "lift" event and reports the "lift" event to the electronic whiteboard. After receiving the "lift" event, the electronic whiteboard removes the ID corresponding to the touch point from the IdList. If the IdList is empty for more than 1 s, it indicates that the touchscreen quits the continuous writing mode, and the first touch point quits the continuous writing. The electronic whiteboard stops timing, resets the timer, and restores to the idle state.

S302: When it is detected that there are at least two touch points on the touchscreen, display input content on the touchscreen based on a movement track of the first touch point, where the at least two touch points include the first touch point.

After the continuous writing mode is entered, the at least two touch points are detected, where the at least two touch points include the second touch point other than the first touch point. The touchscreen may obtain data of the first touch point and data of the second touch point, and report the data of the first touch point and the data of the second touch point to the electronic whiteboard. The data of the first touch point may include an ID, a touch position, and a contact area of the first touch point. The data of the second touch point includes an ID, a touch position, and a contact area of the second touch point. The second touch point represents one or more touch points that continuously operate in another area within a time period. The second touch point may be generated when another object (a sleeve of the user or another part) is in accidental contact with the touchscreen, or the second touch point may be generated when the user operates the displayed content by using a finger.

The at least two touch points include the following cases.

In a first optional manner, whether the contact area of the first touch point or the second touch point is greater than the second preset threshold is determined. If the contact area of the first touch point or the second touch point is greater than the second preset threshold, the touchscreen maintains the continuous writing mode, does not enter the erase mode, and ignores an operation corresponding to the first touch point or the second touch point. In this way, when an unintended operation is caused by the sleeve of the user or another body part in accidental contact with the touchscreen, a writing operation of the user on the touchscreen is not affected by the unintended operation.

In a second optional manner, after the touchscreen enters the continuous writing mode, if the "lift" event is detected, the electronic whiteboard restarts the timer and starts timing. If it is detected that there is the first touch point or the second touch point on the touchscreen, the electronic whiteboard stops timing, and resets the timer. Then whether the contact area of the first touch point or the second touch point is greater than the second preset threshold is determined. If the contact area of the first touch point or the second touch point is greater than the second preset threshold, the touchscreen maintains the continuous writing mode, does not enter the erase mode, and ignores an operation corresponding to the first touch point or the second touch point.

In a third optional manner, after the touchscreen enters the continuous writing mode, if it is detected that the at least two touch points are in contact with the touchscreen simultaneously, whether duration in which the at least two touch points are in contact with the touchscreen exceeds a fourth preset threshold is determined. When the duration in which the at least two touch points are in contact with the touchscreen does not exceed the fourth preset threshold, the input content is displayed on the touchscreen based on the movement track of the first touch point. The fourth preset threshold may include but is not limited to 2 ms or 1.5 s.

For example, after the touchscreen enters the continuous writing mode, if it is detected that the at least two touch points are in contact with the touchscreen simultaneously, a timer is started for timing. If it is detected that one or more touch points of the at least two touch points are removed within 2 s after timing is started, and only one first touch point of the at least two touch points remains in contact with the touchscreen, the input content is displayed on the touchscreen based on the movement track of the first touch point.

If all the at least two touch points are removed, responding to the operation of the user is stopped.

In a fourth optional manner, after the touchscreen enters the continuous writing mode, if it is detected that the at least two touch points are in contact with the touchscreen simultaneously, whether the duration in which the at least two touch points are in contact with the touchscreen exceeds a fourth preset threshold is determined. When the duration in which the at least two touch points are in contact with the touchscreen exceeds the fourth preset threshold, content displayed on the touchscreen is moved or zoomed based on sliding tracks of the at least two touch points.

For example, after the touchscreen enters the continuous writing mode, if it is detected that the at least two touch points are in contact with the touchscreen simultaneously, a timer is started for timing. If the duration in which the at least two touch points are in contact with the touchscreen simultaneously exceeds 2 s, it is determined that the touchscreen enters the move/zoom mode. If directions of the sliding tracks of the two touch points are the same, the content displayed on the touchscreen is moved. If directions of the sliding tracks of the two touch points are opposite, the content displayed on the touchscreen is zoomed.

In a fifth optional manner, after the touchscreen enters the continuous writing mode, whether a quantity of the at least two touch points is greater than or equal to a fifth preset threshold is determined. If the quantity of the at least two touch points is greater than or equal to the fifth preset threshold, the touchscreen enters the move/zoom mode. The fifth preset threshold may be 4. Because when the sleeve is in accidental contact with the touchscreen, a quantity of touch points is usually 2. However, it is a natural operation for the user to perform moving or zooming by using four or five fingers, and the quantity of touch points may be used to correctly distinguish an intention of the user.

For example, as shown in FIG. 7, the first touch point is in the continuous writing, and the touchscreen is in a pen-lifting state after the touchscreen receives the "lift" event. If the duration in which the first touch point fails to be detected exceeds 1 s, it is determined that the first touch point quits the continuous writing and enters the idle state. If the "press" event is received within 1 s after the "lift" event is received, third determining is performed to determine a quantity of touch points on the touchscreen. If the quantity of touch points is greater than or equal to 4, the touchscreen enters the move/zoom mode. If the quantity of touch points is less than 4, when there is only the first touch point, the input content is displayed on the touchscreen based on the movement track of the first touch point. When the quantity of touch points is 2 or 3, whether duration in which the two or three touch points are in contact with the touchscreen simultaneously exceeds 2 s is determined. If the duration exceeds 2 s, the touchscreen enters the move/zoom mode. If the duration does not exceed 2 s, the input content is displayed on the touchscreen based on the movement track of the first touch point.

It should be noted that, in the third optional manner, the fourth optional manner, and the fifth optional manner, a size of a contact area of any one of the at least two touch points may not be considered. In other words, when the contact area of any one of the at least two touch points is greater than the second preset threshold or is not greater than the second preset threshold, a corresponding operation is always performed in the foregoing manner.

The first preset threshold, the second preset threshold, the third preset threshold, the fourth preset threshold, or the fifth preset threshold in embodiments of this application is a balanced value between mistouch prevention and product usability, and is obtained by analyzing a large quantity of real writing data of users. A value of the first preset threshold, the second preset threshold, the third preset threshold, the fourth preset threshold, or the fifth preset threshold is not unique, and may be adjusted based on an actual application scenario.

The following describes an example of an entire process of displaying the operation track.

As shown in FIG. 8, within the first 100 ms after the timer starts timing, when it is detected that the contact area of the first touch point changes, the electronic whiteboard performs the first determining to determine whether the contact area of the first touch point is greater than or equal to the second preset threshold. If the contact area is greater than or equal to the second preset threshold, the touchscreen enters the erase mode. The electronic whiteboard sets the current operation mode to the erase mode, deletes the note corresponding to the first touch point, stops timing, and resets the timer. If the contact area of the first touch point is always less than the second preset threshold within the first 100 ms after the timer starts timing, the touchscreen does not enter the erase mode. Within the next 100 ms after the timer starts timing, the electronic whiteboard performs the second determining to determine whether a touch point other than the first touch point is received. If the touch point other than the first touch point is received, the touchscreen enters the move/zoom mode. The electronic whiteboard sets the current operation mode to the move/zoom mode, records the Id (000002) corresponding to the touch point in the IdList, deletes the ID (000001) of the first touch point, stops timing, and resets the timer.

If no touch point other than the first touch point is detected within 200 ms, and the contact area of the first touch point is less than the second preset threshold, the touchscreen enters the continuous writing mode, and it is determined that the first touch point on the touchscreen is in the continuous writing. After the touchscreen receives the "lift" event, the touchscreen is in the pen-lifting state, and the timer is started for timing. If the duration in which the first touch point fails to be detected exceeds 1 s, it is determined that the first touch point quits the continuous writing and enters the idle state. If the "press" event is received within 1 s after the "lift" event is received, the third determining is performed. If only the first touch point is in contact with the touchscreen, the input content is displayed on the touchscreen based on the movement track of the first touch point. When it is detected that at least two touch points are in contact with the touchscreen simultaneously, a timer is started for timing. If duration in which the at least two touch points are in contact with the touchscreen simultaneously exceeds 2 s, the touchscreen enters the mobile zoom mode. If one or more touch points of the at least two touch points are removed within 2 s, and only one first touch point of the at least two touch points remains in contact with the touchscreen, the input content is displayed on the touchscreen based on the movement track of the first touch point.

In this embodiment of this application, the continuous writing mode is added, so that if a contact area of a touch point is greater than the second preset threshold, input of the touch point is forbidden, and the input content maintains being displayed on the touchscreen based on the movement track of the first touch point. This avoids the unintended operation caused by the sleeve of the user or the another object in accidental contact with the touchscreen. In addition, only when it is detected that the duration in which the at least two touch points are in contact with the touchscreen simultaneously exceeds the fourth preset threshold, the touchscreen enters the move/zoom mode, so that a case in which the continuous writing mode is quit when the another object is in accidental contact with the touchscreen, and consequently a normal writing operation is affected is avoided. When the duration in which the at least two touch points are in contact with the touchscreen simultaneously does not exceed the fourth preset threshold, the continuous writing mode is maintained, thereby improving efficiency of the writing operation.

It may be understood that in the foregoing method embodiments, methods and operations implemented by the electronic device may alternatively be implemented by a component (for example, a chip or a circuit) that may be used in the electronic device. The electronic device may be an analog electronic device.

The foregoing mainly describes the solutions provided in embodiments of this application from a perspective of interaction. It can be understood that, to implement the foregoing functions, the electronic device includes corresponding hardware structures and/or software modules for performing the functions. A person skilled in the art should be able to be aware that, in combination with the examples described in embodiments disclosed in this specification, units and algorithm steps can be implemented by hardware or a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, the electronic device may be divided into functional modules based on the foregoing method examples. For example, each functional module corresponding to each function may be obtained through division, or two or more functions may be integrated into one processing module. The integrated module may be implemented in a form of hardware, or may be implemented in a form of a software function module. It should be noted that, in embodiments of this application, module division is an example, and is merely a logical function division. In actual implementation, another division manner may be used. Descriptions are provided below by using an example in which each function module is obtained through division corresponding to each function.

The method provided in embodiments of this application is described above in detail with reference to FIG. 3. The following describes in detail an apparatus for displaying an operation track according to an embodiment of this application with reference to FIG. 9. It should be understood that descriptions of apparatus embodiment correspond to the descriptions of the method embodiments. Therefore, for content that is not described in detail, refer to the foregoing method embodiments. For brevity, details are not described herein again.

Figure 9:
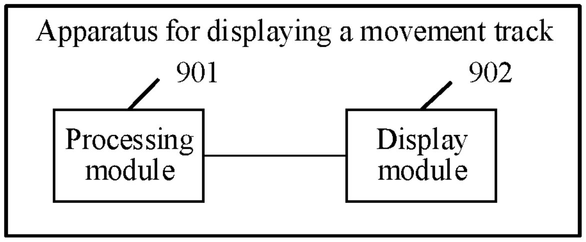
FIG. 9 is a schematic diagram of a structure of an apparatus for displaying an operation track according to an embodiment of this application.

FIG. 9 is a schematic diagram of a structure of an apparatus for displaying an operation track according to an embodiment of this application. The apparatus may include a processing module 901 and a display module 902. The apparatus is configured to perform actions performed by the electronic device in the foregoing method embodiments.

The apparatus for displaying an operation track may implement corresponding steps or procedures performed by the electronic device in the foregoing method embodiments. For example, the apparatus may be an electronic device, or a chip or a circuit configured in the electronic device. The processing module 901 may correspond to the processor of the electronic device 100 in FIG. 1. The display module 902 may correspond to the display screen of the electronic device 100 in FIG. 1.

The processing module 901 is configured to determine that a first touch point on a touchscreen is in continuous writing.

The display module 902 is configured to display input content on the touchscreen based on a movement track of the first touch point when it is detected that there are at least two touch points on the touchscreen, where the at least two touch points include the first touch point.

Optionally, the processing module 901 is further configured to detect that duration in which the first touch point is in a writing state exceeds a first preset threshold. The writing state means that no other touch points exist on the touchscreen, and a contact area of the first touch point is less than a second preset threshold.

Optionally, the processing module 901 is further configured to determine, when duration in which the first touch point fails to be detected exceeds a third preset threshold, that the first touch point quits the continuous writing.

Optionally, the at least two touch points include a second touch point, and a contact area of the second touch point is greater than the second preset threshold.

Optionally, the processing module 901 is further configured to determine whether duration in which the at least two touch points are in contact with the touchscreen exceeds a fourth preset threshold.

The display module 902 is further configured to display the input content on the touchscreen based on the movement track of the first touch point when the duration in which the at least two touch points are in contact with the touchscreen does not exceed the fourth preset threshold.

Optionally, the display module 902 is further configured to move or zoom, based on sliding tracks of the at least two touch points and when the duration in which the at least two touch points are in contact with the touchscreen exceeds the fourth preset threshold, content displayed on the touchscreen.

It should be noted that, for implementation of each module, correspondingly refer to corresponding descriptions of the method embodiment shown in FIG. 3, and the module performs the methods and the functions performed by the electronic device in the foregoing embodiment.

An embodiment of this application further provides a chip system. The chip system includes a processor that is configured to support the electronic device to implement the function in any of the foregoing embodiments. In a possible design, the chip system may further include a memory. The memory is configured to store program instructions and data that are necessary for the electronic device. The chip system may include a chip, or may include a chip and another discrete component. Input and output of the chip system respectively correspond to receiving and sending operations of the electronic device in the method embodiments.

An embodiment of this application further provides an apparatus for displaying an operation track, including a processor and a communication interface. The processor may be configured to perform the methods in the foregoing method embodiments.

An embodiment of this application further provides an apparatus for displaying an operation track, including a processor. The processor may be configured to perform the methods in the foregoing method embodiments.

It should be understood that the processing apparatus may be a chip. For example, the processing apparatus may be a field programmable gate array (FPGA), an application-specific integrated chip (ASIC), a system on chip (SoC), a central processing unit (CPU), a network processor (NP), a digital signal processing circuit (DSP), a micro controller unit (MCU), a programmable controller (PLD), or another integrated chip.

In an implementation process, steps in the foregoing methods can be implemented through a hardware integrated logical circuit in the processor, or through instructions in a form of software. The steps of the methods disclosed with reference to embodiments of this application may be directly performed by a hardware processor, or may be performed through a combination of hardware of a processor and a software module. The software module may be located in a mature storage medium in the art, such as a random access memory, a flash memory, a read-only memory, a programmable read-only memory, an electrically erasable programmable memory, or a register. The storage medium is located in a memory, and the processor reads information in the memory and completes the steps in the foregoing methods in combination with hardware of the processor. To avoid repetition, details are not described herein again.

It should be noted that, the processor in embodiments of this application may be an integrated circuit chip, and has a signal processing capability. In an implementation process, steps in the foregoing method embodiments can be implemented through a hardware integrated logical circuit in the processor, or through instructions in a form of software. The processor may be a general-purpose processor, a digital signal processor (DSP), an application-specific integrated circuit (ASIC), a field programmable gate array (FPGA) or another programmable logic device, a discrete gate or a transistor logic device, or a discrete hardware component. The processor may implement or perform the methods, the steps, and logical block diagrams that are disclosed in embodiments of this application. The general-purpose processor may be a microprocessor, or the processor may be any conventional processor or the like. Steps of the methods disclosed with reference to embodiments of this application may be directly executed and accomplished through a hardware decoding processor, or may be executed and accomplished through a combination of hardware and software modules in the decoding processor. The software module may be located in a mature storage medium in the art, such as a random access memory, a flash memory, a read-only memory, a programmable read-only memory, an electrically erasable programmable memory, or a register. The storage medium is located in a memory, and the processor reads information in the memory and completes the steps in the foregoing methods in combination with hardware of the processor.

Based on the method provided in embodiments of this application, this application further provides a computer program product. The computer program product includes a computer program. When the computer program is run on a computer, the computer is enabled to perform the method in any one of the embodiments shown in FIG. 3.

Based on the method provided in embodiments of this application, this application further provides a computer-readable medium, and the computer-readable medium stores a computer program. When the computer program is run on a computer, the computer is enabled to perform the method in any one of the embodiments shown in FIG. 3.

All or some of the foregoing embodiments may be implemented by using software, hardware, firmware, or any combination thereof. When software is used to implement embodiments, all or a part of embodiments may be implemented in a form of a computer program product. The computer program product includes one or more computer instructions. When the computer instructions are loaded and executed on the computer, the procedure or functions according to embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, a computer, a server, or a data center to another website, another computer, another server, or another data center in a wired (for example, a coaxial cable, an optical fiber, or a digital subscriber line (DSL)) or wireless (for example, infrared, radio, microwave, or the like) manner. The computer-readable storage medium may be any usable medium accessible by the computer, or a data storage device, for example, a server or a data center, integrating one or more usable media. The usable medium may be a magnetic medium (for example, a floppy disk, a hard disk drive, or a magnetic tape), an optical medium (for example, a digital video disc (DVD)), a semiconductor medium (for example, a solid-state drive (SSD)), or the like.

What is claimed is:

1. A method for displaying an operation track, comprising:

determining that a first touch point on a touchscreen is in a continuous writing state by detecting that a duration in which the first touch point is in a writing state exceeds a first preset threshold, wherein the writing state is a state in which no other touch points exist on the touchscreen, and a contact area of the first touch point is less than a second preset threshold;

in response to detecting that at least two touch points exist on the touchscreen, displaying input content on the touchscreen based on a movement track of the first touch point, wherein the at least two touch points comprise the first touch point; and in response to a duration in which the first touch point fails to be detected exceeds a third preset threshold after the first touch point is determined to be in the continuous writing state, determining that the first touch point is no longer in the continuous writing state.

2. The method according to claim 1, wherein the at least two touch points comprise a second touch point, and a contact area of the second touch point is greater than the second preset threshold.

3. The method according to claim 1, wherein:

the method further comprises, in response to detecting that the at least two touch points exist on the touchscreen, determining whether a duration in which the at least two touch points are in contact with the touchscreen exceeds a fourth preset threshold; and displaying the input content on the touchscreen based on the movement track of the first touch point comprises: in response to the duration in which the at least two touch points are in contact with the touchscreen not exceeding the fourth preset threshold, displaying the input content on the touchscreen based on the movement track of the first touch point.

4. The method according to claim 3, further comprising:

in response to the duration in which the at least two touch points are in contact with the touchscreen exceeding the fourth preset threshold, moving or zooming, based on sliding tracks of the at least two touch points, content displayed on the touchscreen.

5. An electronic device, comprising a processor and a memory with computer instructions stored thereon, wherein the computer instructions, when executed by the processor, enable the electronic device to perform:

determining that a first touch point on a touchscreen is in a continuous writing state by detecting that a duration in which the first touch point is in a writing state exceeds a first preset threshold, wherein the writing state is a state in which no other touch points exist on the touchscreen, and a contact area of the first touch point is less than a second preset threshold;

in response to detecting that at least two touch points exist on the touchscreen, displaying input content on the touchscreen based on a movement track of the first touch point, wherein the at least two touch points comprise the first touch point; and in response to a duration in which the first touch point fails to be detected exceeds a third preset threshold after the first touch point is determined to be in the continuous writing state, determining that the first touch point is no longer in the continuous writing state.

6. The electronic device according to claim 5, wherein the at least two touch points comprise a second touch point, and a contact area of the second touch point is greater than the second preset threshold.

7. The electronic device according to claim 5, wherein:

the computer instructions, when executed by the processor, further enable the electronic device to perform: in response to detecting that the at least two touch points exist on the touchscreen, determining whether a duration in which the at least two touch points are in contact with the touchscreen exceeds a fourth preset threshold; and displaying the input content on the touchscreen based on the movement track of the first touch point comprises: in response to the duration in which the at least two touch points are in contact with the touchscreen not exceeding the fourth preset threshold, displaying the input content on the touchscreen based on the movement track of the first touch point.

8. The electronic device according to claim 7, wherein the computer instructions, when executed by the processor, further enable the electronic device to perform:

in response to the duration in which the at least two touch points are in contact with the touchscreen exceeding the fourth preset threshold, moving or zooming, based on sliding tracks of the at least two touch points, content displayed on the touchscreen.

9. A non-transitory computer-readable storage medium with a computer program stored thereon, wherein the computer program, when executed by a computer, enables the computer to perform:

determining that a first touch point on a touchscreen is in a continuous writing state by detecting that a duration in which the first touch point is in a writing state exceeds a first preset threshold, wherein the writing state is a state in which no other touch points exist on the touchscreen, and a contact area of the first touch point is less than a second preset threshold;

in response to detecting that at least two touch points exist on the touchscreen, displaying input content on the touchscreen based on a movement track of the first touch point, wherein the at least two touch points comprise the first touch point; and in response to a duration in which the first touch point fails to be detected exceeds a third preset threshold after the first touch point is determined to be in the continuous writing state, determining that the first touch point is no longer in the continuous writing state.

10. The non-transitory computer-readable storage medium according to claim 9, wherein the at least two touch points comprise a second touch point, and a contact area of the second touch point is greater than the second preset threshold.

11. The non-transitory computer-readable storage medium according to claim 9, wherein:

the computer program, when executed by the computer, further enables the computer to perform: in response to detecting that the at least two touch points exist on the touchscreen, determining whether a duration in which the at least two touch points are in contact with the touchscreen exceeds a fourth preset threshold; and displaying the input content on the touchscreen based on the movement track of the first touch point comprises: in response to the duration in which the at least two touch points are in contact with the touchscreen not exceeding the fourth preset threshold, displaying the input content on the touchscreen based on the movement track of the first touch point.

12. The non-transitory computer-readable storage medium according to claim 11, wherein the computer program, when executed by the computer, further enables the computer to perform:

in response to the duration in which the at least two touch points are in contact with the touchscreen exceeding the fourth preset threshold, moving or zooming, based on sliding tracks of the at least two touch points, content displayed on the touchscreen.

13. The method according to claim 1, further comprising:

after detecting the first touch point on the touchscreen, starting a timer;

within a first time window after the timer starts, determining whether the contact area of the first touch point is greater than or equal to the second preset threshold, and in response to the contact area being greater than or equal to the second preset threshold, determining that the touchscreen enters an erase mode;

within a second time window after the first time window, determining whether a touch point other than the first touch point is detected, and in response to the touch point other than the first touch point being detected, determining that the touchscreen enters a move/zoom mode; and in response to neither the erase mode nor the move/zoom mode being entered within the first time window and the second time window, determining that the first touch point is in the continuous writing state.

14. The method according to claim 13, wherein the first time window is 100 milliseconds, and the second time window is 100 milliseconds following the first time window.

15. The method according to claim 1, further comprising:

in response to detecting that the at least two touch points exist on the touchscreen after the first touch point is determined to be in the continuous writing state, determining a quantity of the at least two touch points; and in response to the quantity of the at least two touch points being greater than or equal to a fifth preset threshold, determining that the touchscreen enters a move/zoom mode.

16. The electronic device according to claim 5, further comprising:

after detecting the first touch point on the touchscreen, starting a timer;

within a first time window after the timer starts, determining whether the contact area of the first touch point is greater than or equal to the second preset threshold, and in response to the contact area being greater than or equal to the second preset threshold, determining that the touchscreen enters an erase mode;

within a second time window after the first time window, determining whether a touch point other than the first touch point is detected, and in response to the touch point other than the first touch point being detected, determining that the touchscreen enters a move/zoom mode; and in response to neither the erase mode nor the move/zoom mode being entered within the first time window and the second time window, determining that the first touch point is in the continuous writing state.

17. The electronic device according to claim 16, wherein the first time window is 100 milliseconds, and the second time window is 100 milliseconds following the first time window.

18. The electronic device according to claim 5, further comprising:

in response to detecting that the at least two touch points exist on the touchscreen after the first touch point is determined to be in the continuous writing state, determining a quantity of the at least two touch points; and in response to the quantity of the at least two touch points being greater than or equal to a fifth preset threshold, determining that the touchscreen enters a move/zoom mode.

19. The non-transitory computer-readable storage medium according to claim 9, wherein the computer program, when executed by the computer, further enables the computer to perform:

after detecting the first touch point on the touchscreen, starting a timer;

within a first time window after the timer starts, determining whether the contact area of the first touch point is greater than or equal to the second preset threshold, and in response to the contact area being greater than or equal to the second preset threshold, determining that the touchscreen enters an erase mode;

within a second time window after the first time window, determining whether a touch point other than the first touch point is detected, and in response to the touch point other than the first touch point being detected, determining that the touchscreen enters a move/zoom mode; and in response to neither the erase mode nor the move/zoom mode being entered within the first time window and the second time window, determining that the first touch point is in the continuous writing state.

20. The non-transitory computer-readable storage medium according to claim 9, wherein the computer program, when executed by the computer, further enables the computer to perform:

in response to detecting that the at least two touch points exist on the touchscreen after the first touch point is determined to be in the continuous writing state, determining a quantity of the at least two touch points; and in response to the quantity of the at least two touch points being greater than or equal to a fifth preset threshold, determining that the touchscreen enters a move/zoom mode.

* * * * *